United States Patent
Nogawa

(10) Patent No.: US 8,607,048 B2
(45) Date of Patent: Dec. 10, 2013

(54) WIRELESS COMMUNICATION SYSTEM

(75) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 160 days.

(21) Appl. No.: 13/048,201

(22) Filed: Mar. 15, 2011

(65) Prior Publication Data

US 2011/0228330 A1 Sep. 22, 2011

(30) Foreign Application Priority Data

Mar. 18, 2010 (JP) ................................. 2010-062115

(51) Int. Cl.
*H04L 29/06* (2006.01)
*G06F 21/00* (2013.01)

(52) U.S. Cl.
USPC ................................. 713/168; 726/3; 380/270

(58) Field of Classification Search
None
See application file for complete search history.

(56) References Cited

U.S. PATENT DOCUMENTS

| | | | |
|---|---|---|---|
| 2005/0125693 A1 | 6/2005 | Duplessis et al. | |
| 2005/0148326 A1 | 7/2005 | Nogawa et al. | |
| 2007/0168572 A1 | 7/2007 | Miyazawa | |
| 2008/0086760 A1 | 4/2008 | Jiang et al. | |
| 2008/0181187 A1* | 7/2008 | Scott et al. | 370/338 |
| 2010/0082978 A1 | 4/2010 | Suzuki et al. | |

FOREIGN PATENT DOCUMENTS

| | | |
|---|---|---|
| JP | 2005-174134 | 6/2005 |
| JP | 2005-176320 | 6/2005 |
| JP | 2007-164680 | 6/2007 |
| JP | 2010-087909 | 4/2010 |

OTHER PUBLICATIONS

Extended European search report for application No. 11154870.7 mailed Jul. 13, 2011.
Notification of Reasons for Rejection issued in corresponding Japanese Patent Application No. 2010-062115 dated Apr. 2, 2013.
Office Action received in corresponding European Patent Application No. 11154870.7, mailed Aug. 5, 2013.

* cited by examiner

*Primary Examiner* — Gilberto Barron, Jr.
*Assistant Examiner* — Izunna Okeke
(74) *Attorney, Agent, or Firm* — Banner & Witcoff, Ltd.

(57) ABSTRACT

A wireless communication system may acquire specific information including identification information from each of access points. The wireless communication system may select particular identification information corresponding to a particular access point among the one or more of access points. The wireless communication system may determine, by using the specific information acquired from the particular access point, whether the particular access point operates in accordance with a first or a second type of authentication protocol. The wireless communication system may cause a displaying unit to display a first type of setting screen if the particular access point operates in accordance with the first type of authentication protocol. The wireless communication system may cause the displaying unit to display a second type of setting screen, which is different from the first type of setting screen, if the particular access point operates in accordance with the second type of authentication protocol.

5 Claims, 5 Drawing Sheets

FIG. 2

| Authentication Method Type | Authentication Method | | Encryption Method | Internal Authentication Method | |
|---|---|---|---|---|---|
| | Authentication Protocol | EAP Authentication Method | | | |
| Enterprise Type | WPA-Enterprise | EAP-FAST | TKIP | NONE | *1 |
| | | | | MSCHAPv2 | |
| | | | | GTC | |
| | | | | TLS | |
| | | PEAP | TKIP | MSCHAPv2 | |
| | | | | GTC | |
| | | | | TLS | |
| | | EAP-TTLS | TKIP | CHAP | |
| | | | | MSCHAP | |
| | | | | MSCHAPv2 | |
| | | | | PAP | |
| | | EAP-TLS | TKIP | — | *2 |
| | WPA2-Enterprise | EAP-FAST | AES | NONE | *1 |
| | | | | MSCHAPv2 | |
| | | | | GTC | |
| | | | | TLS | |
| | | PEAP | AES | MSCHAPv2 | |
| | | | | GTC | |
| | | | | TLS | |
| | | EAP-TTLS | AES | CHAP | |
| | | | | MSCHAP | |
| | | | | MSCHAPv2 | |
| | | | | PAP | |
| | | EAP-TLS | AES | — | *2 |
| Personal Type | WPA-PSK | — | TKIP | — | *3 |
| | | | AES | — | |
| | WPA2-PSK | — | TKIP | — | |
| | | | AES | — | |
| | Open | — | WEP | — | *4 |
| | | | — | — | |
| | Shared key | — | WEP | — | *4 |

*1 : User ID and Password
*2 : User ID and Client Certification
*3 : Password (8~64 Characters)
*4 : Password (5,10,13,26 Characters)

WIRELESS COMMUNICATION SYSTEM

CROSS-REFERENCE TO RELATED APPLICATIONS

This application claims priority to Japanese Patent Application No. 2010-062115, filed on Mar. 18, 2010, the contents of which are hereby incorporated by reference into the present application.

TECHNICAL FIELD

The present specification discloses a wireless communication system.

DESCRIPTION OF RELATED ART

There is a technique for a user to give a setting in a printer for the printer to perform a wireless communication with an access point (hereinafter simply referred to as a "wireless setting"). The user can designate information for the wireless setting (information concerning an authentication method, an encryption method and the like) via a screen displayed on a displaying unit of a PC. The PC sends the information concerning the wireless setting designated by the user to the printer. The printer sets (that is, registers) the wireless setting indicated by the foregoing information received from the PC as its own wireless setting.

SUMMARY

There are cases where the information to be designated by the user as information for the wireless setting differs according to the type of an authentication protocol which the access point operates in accordance with. The foregoing conventional technique gives no consideration to this kind of situation. This specification discloses a technique that may support the user to designate the wireless setting.

The technique taught by the present specification is a wireless communication device. The wireless communication system may comprise an acquiring unit, a selecting unit, a determining unit, a display controlling unit and a connection unit. The acquiring unit may be configured to acquire, from each of one or more of access points, specific information including identification information corresponding to the access point. The selecting unit may be configured to select, from one or more of the acquired identification information, particular identification information corresponding to a particular access point among the one or more of access points. The determining unit may be configured to determine, in a case where the particular identification information is selected, using the specific information acquired from the particular access point, whether the particular access point operates in accordance with a first type of authentication protocol in which an authentication is performed by an authentication server or the particular access point operates in accordance with a second type of authentication protocol in which an authentication is performed by the particular access point. The display controlling unit may be configured to cause a displaying unit to display a first type of setting screen in a first case where a determination is made that the particular access point operates in accordance with the first type of authentication protocol, the first type of setting screen permitting a user to give a setting for a wireless communication with the particular access point that operates in accordance with the first type of authentication protocol. The display controlling unit may be configured to cause the displaying unit to display a second type of setting screen which is different from the first type of setting screen in a second case where a determination is made that the particular access point operates in accordance with the second type of authentication protocol, the second type of setting screen permitting the user to give a setting for a wireless communication with the particular access point that operates in accordance with the second type of authentication protocol. The connecting unit may be configured to attempt a wireless connection with the particular access point based on a setting given by the user using the first type of setting screen or the second type of setting screen.

Note that a method, a computer program for realizing the foregoing wireless communication system and a non-transitory computer readable medium including the computer program are also novel and useful. Moreover, a device configuring the foregoing wireless communication system, a computer program for realizing the device, and a non-transitory computer readable medium including the computer program are also novel and useful.

BRIEF DESCRIPTION OF THE DRAWINGS

FIG. 2 shows a table for explaining an authentication method.

EMBODIMENT

Figure 1:
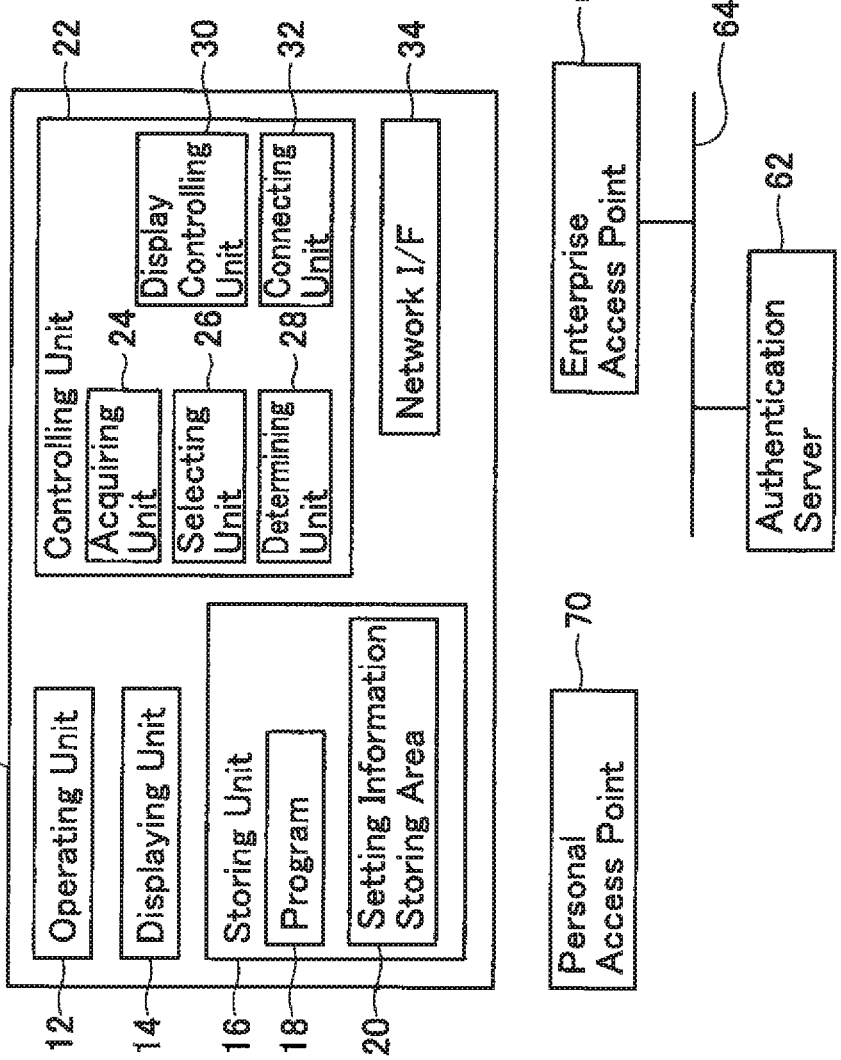
FIG. 1 shows an example of a configuration of a network system.

An embodiment will be explained with reference to the drawings. As shown in FIG. 1, a network system 2 comprises a multi-function device 10, an enterprise access point 60 (an "access point" is hereinafter referred to as an "AP"), an authentication server 62, and a personal AP 70. The enterprise AP 60 is capable of communicating with the authentication server 62 via a wired LAN 64. If a wireless setting for achieving a wireless connection with the enterprise AP 60 is set in the multi-function device 10, the multi-function device 10 can communicate wirelessly with the enterprise AP 60. Note that, in this embodiment, the term "wireless connection" is used in the following context. Specifically, in a state where a device is in a "wireless connection" with the AP, that device is capable of communicating with another device via the AP. Meanwhile, if a device is not in a "wireless connection" with the AP, that device can perform a wireless communication with the AP (e.g., the wireless communication of authentication information described later), but is not capable of communicating with another device via the AP. Moreover, if a wireless setting for achieving a wireless connection with the personal AP 70 is set in the multi-function device 10, the multi-function device 10 can communicate wirelessly with the personal AP 70.

(Configuration of Multi-Function Device)

As shown in FIG. 1, the multi-function device (peripheral device) 10 comprises a operating unit 12, a displaying unit 14, a storing unit 16, a controlling unit 22, and a network interface 34. Note that the multi-function device 10 further comprises a scanning unit and a printing unit not shown. The operating unit 12 is configured from a plurality of buttons to be operated by a user. The displaying unit 14 is a display for displaying various types of information. The controlling unit 22 performs various types of processes according to a program 18 stored in the storing unit 16. As a result of the controlling unit 22 performing the processes according to the program 18, the respective functions of an acquiring unit 24, a selecting unit 26, a determining unit 28, a display controlling unit 30, and a connecting unit 32 are realized. Note that, although the specific functions of the respective units 24 to 30 are explained later, the connecting unit 32 achieves a wireless connection with either the AP 60 or the AP 70 according to the setting information stored in the setting information storing area 20 of the storing unit 16. The connecting unit 32 is thereby capable of communicating with another device, via an AP to which the multi-function device 10 is wirelessly connected, which is wirelessly connected to the AP. The storing unit 16 stores the program 18 performed by the controlling unit 22. The storing unit 16 further comprises a setting information storing area 20. The setting information storing area 20 is capable of storing the setting information for the connecting unit 32 to achieve a wireless connection with either the AP 60 or the AP 70. The network interface 34 is an interface for the multi-function device 10 to perform the wireless connection.

(Type of Authentication Method of AP)

An administrator of the network system 2 sets in advance the wireless setting for operating according to an enterprise type authentication method (refer to FIG. 2) in the enterprise AP 60. When an external device (e.g., the multi-function device 10) attempts to achieve a wireless connection with the enterprise AP 60, the enterprise AP 60 causes the authentication server 62 to authenticate external device according to the wireless setting that is set in itself. Specifically, the enterprise AP 60 acquires authentication information required for performing authentication from the external device, and sends the authentication information to the authentication server 62. The authentication server 62 performs the authentication the external device using the authentication information, and sends the authentication result to the enterprise AP 60. If the authentication result is successful, the enterprise AP 60 allows the external device to be wirelessly connected with the enterprise AP 60, and if the authentication result is unsuccessful, prohibits the external device from being wirelessly connected with the enterprise AP 60. Otherwise, the administrator sets in advance the setting information for operating according to a personal type authentication method (refer to FIG. 2) in the personal AP 70. When an external device attempts to achieve a wireless connection with the personal AP 70, the personal AP 70 causes itself to authenticate the external device according to the wireless setting that is set in itself. Specifically, the personal AP 70 acquires authentication information from the external device, and performs the authentication for the external device using the authentication information on its own. If the authentication result is successful, the personal AP 70 allows the external device to be wirelessly connected with the personal AP 70, and, if the authentication result is unsuccessful, prohibits the external device from being wirelessly connected with the personal AP 70.

(Enterprise Type Authentication Method)

FIG. 2 shows an example of the authentication methods that are available to the multi-function device 10. The authentication method is classified into an enterprise type authentication method and a personal type authentication method. The enterprise type authentication method is classified into two types of enterprise type authentication protocols of WPA (WiFi-Protected Access)-Enterprise and WPA2-Enterprise. The WPA-Enterprise conforms to IEEE802.1x (The Institute of Electrical and Electronics Engineers, Inc.), and is a standard that was further expanded, and is a standard that was formulated based on Wi-Fi Alliance. The WPA2-Enterprise is a standard that was further expanded upon incorporating the WPA-Enterprise, and is a standard that was formulated based on the Wi-Fi Alliance. Specifically, the enterprise type authentication method is an authentication method for achieving wireless communication using IEEE802.1x. The two types of enterprise type authentication protocols are both further classified into a plurality of EAP (Extensible Authentication Protocol) authentication methods. The plurality of EAP authentication methods includes EAP-FAST (EAP-Flexible Authentication via Secured Tunnel), PEAP (Protected EAP), EAP-TTLS (EAP-Tunneled Transport Layer Security), and EAP-TLS (EAP-Transport Layer Security).

The respective EAP authentication methods of the WPA-Enterprise use an encryption method of TKIP (Temporal Key Integrity Protocol). Meanwhile, the respective EAP authentication methods of the WPA2-Enterprise use an encryption method of AES (Advanced Encryption Standard). The enterprise AP 60 and the external device encrypt data to be communicated according to a pre-set encryption method, and thereby perform data communication. Note that, as evident from the foregoing explanation, in this embodiment there are four combinations of the EAP authentication method and the encryption method with WPA-Enterprise, and also four combinations of the EAP authentication method and the encryption method with WPA-Enterprise2. Specifically, in this embodiment, there are a total of eight combinations of the enterprise type authentication method.

Moreover, in either of WPA-Enterprise and WPA2-Enterprise, similarly, an internal authentication is performed if EAP-FAST, PEAP, or EAP-TTLS is used. Meanwhile, the internal authentication is not performed if EAP-TLS is used. The internal authentication method is classified into NONE, MSCHAP (Microsoft Challenge Handshake Authentication Protocol), MSCHAP v2, GTC (Generic Token Card), TLS (Transport Layer Security), and PAP (Password Authentication Protocol). Note that the foregoing "NONE" is one type of internal authentication method, and does not mean that the internal authentication is not performed. The available internal authentication method differs according to the EAP authentication method. For example, with EAP-FAST, one internal authentication method among NONE, MSCHAP v2, GTC, and TLS is available, and with PEAP, one internal authentication method among MSCHAP v2, GTC, and TLS is available.

Note that if EAP-FAST, PEAP, or EAP-TTLS is used, the authentication server 62 performs the authentication for the external device (e.g., the multi-function device 10) using the user ID and password multi-function (refer to *1 of FIG. 2). Accordingly, if the AP (e.g., the enterprise AP 60) and the external device are wirelessly connected using EAP-FAST, PEAP, or EAP-TTLS, it is necessary to pre-register the same user ID and password in both the authentication server (e.g., the authentication server 62) and the external device. Meanwhile, if EAP-TLS is used, the authentication server 62 performs the authentication for the external device (e.g., the multi-function device 10) using the user ID and client certificate (refer to *2 of FIG. 2). Accordingly, if the AP and the external device are wirelessly connected using EAP-TLS, it is necessary to pre-register the same user ID and client certificate in both the authentication server and the external device.

(Personal Type Authentication Method)

The personal type authentication method is classified into four types of personal type authentication protocols of WPA-PSK (WPA-Pre-shared Key), WPA2-PSK, Open, and Shared key. Note that "Open" is a protocol for which the authentication is not performed, but is treated as one type of authentication method in this specification. The personal type authentication method is an authentication method for achieving wireless communication that does not use IEEE802.1x. WPA-PSK and WPA2-PSK use an encryption method of TKIP or AES. Open uses an encryption method of WEP (Wired Equivalent Privacy), or does not use an encryption method. Shared key uses an encryption method of WEP. The personal AP 70 and the external device encrypt data to be communicated according to a pre-set encryption method, and thereby perform data communication. In particular, if WEP is used as the encryption method, the personal AP 70 and the external device encrypt data with a WEP key. Note that, as evident from the foregoing explanation, in this embodiment, there are six combinations of the authentication method and the encryption method with the personal type authentication protocol. The foregoing six combinations do not include Open in which an encryption method is not used, and includes Open in which the encryption method of WEP is used.

Note that if WPA-PSK or WPA2-PSK is used, the personal AP 70 performs the authentication for the external device (e.g., the multi-function device 10) using a password of 8 to 64 characters (refer to *3 of FIG. 2). Accordingly, if the AP and the external device are wirelessly connected using WPA-PSK and WPA2-PSK, it is necessary to pre-register the same password of 8 to 64 characters in both the AP and the external device. Moreover, if Open (referring only to the Open in which the encryption method of WEP is used) or Shared key is used, the personal AP 70 performs the authentication for the external device (e.g., the multi-function device 10) using a password (WEP key) of 5, 10, 13, or 26 characters (refer to *4 of FIG. 2) multi-function. Accordingly, if the AP and the external device are wirelessly connected using Open or Shared key, it is necessary to pre-register the same password coinciding with the foregoing number of characters in both the AP and the external device.

(Wireless Connection Process Performed by Multi-Function Device)

The wireless connection process performed by the multi-function device 10 is now explained with reference to FIG. 3. The user of the multi-function device 10 performs the wireless setting for the multi-function device 10 to achieve a wireless connection with either the AP 60 or the AP 70. Foremost, the user can operate the operating unit 12 (refer to FIG. 1) and perform a predetermined setting start operation into the multi-function device 10. The controlling unit 22 monitors that the setting start operation is operated by the user (S12). If the result is YES in the foregoing case, the acquiring unit 24 (refer to FIG. 1) sequentially selects one channel among a plurality of channels (i.e. frequency bands) for achieving a wireless communication, and sequentially sends Probe Request packets sequentially using the sequentially selected channels (S14). The AP (e.g., the APs 60, 70) that received the Probe Request packet sent from the acquiring unit 24 sends, in response to the Probe Request packet, a Probe Response packet to the multi-function device 10. Consequently, the acquiring unit 24 receives one or more Probe Response packets 80 from one or more APs (in this embodiment, two APs 60, 70) (S16). Each of the one or more Probe Response packets 80 received at S16 includes an Information Element 82. The Information Element 82 includes an SSD) 84. If the Probe Response packet 80 is a packet sent from the enterprise AP (e.g., the enterprise AP 60), the Information Element 82 further includes information 86 indicating the authentication protocol which is currently set in the source AP. More specifically, in this embodiment, the information 86 is either information indicating that it is WPA-Enterprise, or information indicating that it is WPA2-Enterprise. Note that if the Probe Response packet 80 is a packet sent from the personal AP (e.g., the personal AP 70), the Information Element 82 additionally includes encryption information concerning whether to use the encryption method.

The acquiring unit 24 selects one Probe Response packet 80 among the one or more received Probe Response packets 80 (S18). The acquiring unit 24 acquires the Information Element 82 included in the one Probe Response packet 80 selected at S18 (S20). Subsequently, the determining unit 28 determines whether the information 86 is included in the Information Element 82 acquired at S20 (S22). Specifically, at S22, the determining unit 28 determines whether the source AP of the one Probe Response packet selected at S18 is currently operating in accordance with the enterprise type authentication protocol or operating in accordance with the personal type authentication protocol. If the result is YES in the foregoing case, the routine proceeds to S24, and, if the result is NO, the routine proceeds to S26. At S24, the controlling unit 22 stores a combination of information (e.g., flag "1") indicating the enterprise type authentication protocol and the SSID 84 in the Information Element 82 acquired at S20 in the storing unit 16. Meanwhile, at S26, the controlling unit 22 stores a combination of information (e.g., flag "0") indicating the personal type authentication protocol and the SSID 84 in the Information Element 82 acquired at S20 in the storing unit 16.

Subsequently, the controlling unit 22 determines whether the processes of S18 to S26 are complete for all Probe Response packets 80 received at S16 (S28). If the result is NO in the foregoing case, the acquiring unit 24 returns to S18 and selects another Probe Response packet 80. If the result is YES at S28, the display controlling unit 30 causes the displaying unit 14 to display a list of one or more SSIDs 84 stored in the storing unit 16 at S24 or S26 (S30). The user can operate the operating unit 12 and designate one SSID (hereinafter referred to as the "particular SSID") from the list of SSIDs 84. The selecting unit 26 selects the foregoing particular SSID from the list of the SSIDs 84 in accordance with the designation operation of the user (S32). Subsequently, the determining unit 28 determines whether the foregoing particular SSID is stored associated with information (e.g., flag "1") indicating the enterprise type authentication protocol in the storing unit 16 (S34). If the result is YES in the foregoing case, the controlling unit 22 performs the enterprise process (S38). The user is thereby able to perform wireless setting (hereinafter referred to as the "enterprise type wireless setting") for the multi-function device 10 to achieve a wireless connection with the enterprise AP 60. Moreover, if the result is NO at S34, the controlling unit 22 performs the personal process (S36). The user is thereby able to perform wireless setting (hereinafter referred to as the "personal type wireless setting") for the multi-function device 10 to achieve a wireless communication with the personal AP 70.

(Enterprise Process Performed by Multi-Function Device)

The enterprise process (process of S38 of FIG. 3) performed by the multi-function device 10 is now explained with reference to FIG. 4. As explained in detail below, in the enterprise process, the display controlling unit 30 causes to display sequentially a plurality of screens 100 to 600 to be used by the user for designating a plurality of setting information. This plurality of setting information concerns a plurality of setting items (EAP authentication method, encryption method and so on) to be designated by the user for the enterprise type wireless setting. The user can sequentially designate the plurality of setting information in accordance with the plurality of screens 100 to 600 which are sequentially displayed.

Foremost, the display controlling unit 30 causes the displaying unit 14 to display the screen 100 including a list 102 of the EAP authentication methods corresponding to the enterprise type authentication protocol (S42). The list 102 includes character strings respectively indicating the plurality of (four in this embodiment) EAP authentication methods. Note that the screen 100 includes, in addition to the list 102, an OK button 104 and a CANCEL button 106. The user can operate the operating unit 12 and designate one character string indicating one EAP authentication method among the plurality of character strings indicating the plurality of EAP authentication methods in the list 102. When one character string indicating one EAP authentication method is designated by the user (FIG. 4 shows an example of a case where "PEAP" is designated), the display controlling unit 30 causes the displaying unit 14 to display the character string indicating the designated EAP authentication method in a mode which is different from the character strings indicating the other EAP authentication methods. In this embodiment, as shown with the screen 100, the designated character string "PEAP" is displayed in outlined letters, and the character strings indicating the other EAP authentication methods are displayed in black letters.

The user can operate one button of either the OK button 104 or the CANCEL button 106 by operating the operating unit 12. Although not shown in FIG. 4, if the CANCEL button 106 is operated by the user, the controlling unit 22 ends the enterprise process. Note that, in the other screens 200 to 600 explained below, if the CANCEL buttons 206 to 606 are operated by the user, the controlling unit 22 also ends the enterprise process. Meanwhile, if the OK button 104 is operated by the user, the controlling unit 22 selects the EAP authentication method (hereinafter referred to as the "specific EAP authentication method") corresponding to the character string designated by the user among the plurality of EAP authentication methods (S44).

Subsequently, the controlling unit 22 determines whether the foregoing specific EAP authentication method is an EAP authentication method for performing internal authentication (S46). As shown in FIG. 2, if the EAP authentication method is EAP-FAST, PEAP, or EAP-TTLS, internal authentication is performed. Meanwhile, if the EAP authentication method is EAP-TLS, internal authentication is not performed. If the result is YES at S46, the routine proceeds to S48, and, if the result is NO, the routine proceeds to S52.

At S48, the display controlling unit 30 causes the displaying unit 14 to close the screen 100 and newly display the screen 200 for designating the internal authentication method. The screen 200 includes a list 202 of the internal authentication methods corresponding to the foregoing specific EAP authentication method, an OK button 204, and a CANCEL button 206. The list 202 includes a plurality of character strings indicating a plurality of internal authentication methods corresponding to the foregoing specific EAP authentication method, but does not include character strings indicating the internal authentication methods which do not correspond to the foregoing specific EAP authentication method. The list 202 shown in FIG. 4 shows an example of a case where the foregoing specific EAP authentication method is PEAP. As shown in FIG. 2, in the case of PEAP, the internal authentication methods of MSCHAP v2, GTC, and Us are used. Accordingly, the list 202 includes a plurality of character strings indicating MSCHAP v2, GTC, and TLS, and does not include character strings indicating the internal authentication methods which do not correspond to PEAP such as NONE or PAP. The user can operate the operating unit 12 and designate one character string indicating one internal authentication method among a plurality of character strings indicating a plurality of internal authentication methods in the list 202. When the character string of one internal authentication method is designated by the user (FIG. 4 shows an example of a case where "TLS" is designated), the display controlling unit 30 causes the displaying unit 14 to display the character string indicating the designated internal authentication method on in a mode (e.g., in outlined letters) which is different from the character strings indicating the other internal authentication methods (e.g., in black letters). When the OK button 204 is operated by the user, the controlling unit 22 selects the internal authentication method corresponding to the character string designated by the user among the plurality of internal authentication methods (S50). When S50 is complete, the routine proceeds to S52.

At S52 that is performed after S50, the display controlling unit 30 causes the displaying unit 14 to close the screen 200 and newly display the screen 300 for designating the encryption method. Meanwhile, at S52 that is performed when the result is NO at S46, the display controlling unit 30 causes the displaying unit 14 to close the screen 100 and newly display the screen 300 for designating the encryption method without displaying the screen 200. The screen 300 includes a list 302 of the encryption methods, an OK button 304, and a CANCEL button 306. As shown in FIG. 2, with the enterprise type authentication protocol, regardless of the EAP authentication method, the encryption method of TKIP or AES is used. Accordingly, the list 302 includes the character strings respectively indicating TKIP and AES. The user can operate the operating unit 12 and designate one character string showing one encryption method among a plurality of (two in this embodiment) character strings indicating a plurality of encryption methods in the list 302. When the character string showing one encryption method is designated by the user (FIG. 4 shows an example of a case where the character string "AES" is designated), the display controlling unit 30 causes the displaying unit 14 to display the character string indicating the designated encryption method (e.g., in outlined letters) in a mode which is different from the character strings indicating the other encryption methods (e.g., in black letters). When the OK button 304 is operated by the user, the controlling unit 22 selects the encryption method corresponding to the character string designated by the user among a plurality of encryption methods (S54).

Subsequently, the controlling unit 22 determines whether the foregoing specific EAP authentication method is an EAP authentication method which requires a client certificate; specifically, whether it is EAP-TLS (S56). If the result is YES in the foregoing case, the routine proceeds to S58, and if the result is NO, the routine proceeds to S62. At S58, the display controlling unit 30 causes the displaying unit 14 to close the screen 300 and newly display the screen 400 for designating the client certificate. The screen 400 includes a list 402 of one or more certificate identification information (e.g., file name of the certificate) indicating one or more client certificates that have been installed in the multi-function device 10, an OK button 404, and a CANCEL button 406. The user can operate the operating unit 12 and designate one character string showing one client certificate among one or more character strings indicating one or more client certificates in the list 402. When one character string showing one client certificate is designated by the user (FIG. 4 shows an example of a case where the second certificate is designated), the display controlling unit 30 causes the displaying unit 14 to display the character string showing the designated client certificate in a mode (e.g., in outlined letters) which is different from the character strings indicating the other client certificates (e.g., in black letters). When the OK button 404 is operated by the user, the controlling unit 22 selects the one client certificate corresponding to the character string designated by the user among the one or more client certificates which have been installed in the multi-function device 10 (S60). When S60 is complete, the routine proceeds to S62.

At S62 which is performed after S60, the display controlling unit 30 causes the displaying unit 14 to close the screen 400 and newly display the screen 500 for designating (inputting) the user ID. Meanwhile, at S62 which is performed when the result at S56 is NO, the display controlling unit 30 causes the displaying unit 14 to close the screen 300, and newly display the screen 500 for designating the user ID without displaying the screen 400. The screen 500 includes a character string 502 for urging the user to input the user ID, a user ID input area 503, an OK button 504, and a CANCEL button 506. As shown in FIG. 2, with the enterprise type authentication protocol, regardless of the EAP authentication method, the user ID is used. The user can operate the operating unit 12 and input the user ID in the user ID input area 503. Note that the user needs to input the same user ID as the user ID which has been registered in the authentication server 62. When the OK button 504 is operated by the user, the routine proceeds to S64.

At S64, the controlling unit 22 determines whether the foregoing specific EAP authentication method is an EAP authentication that requires a password (S64). As shown in FIG. 2, a password is required with the EAP authentication methods other than EAP-TLS. Accordingly, the controlling unit 22 determines that the result is YES at S64 if the foregoing specific EAP authentication method is an EAP authentication method other than EAP-TLS, and determines that the result is NO at S64 if the foregoing specific EAP authentication method is EAP-TLS. If the result is YES at S64, the routine proceeds to S66, and, if the result is NO, the routine proceeds to S70.

At S66, the display controlling unit 30 causes the displaying unit 14 to close the screen 500 and newly display the screen 600 for designating (inputting) the password. The screen 600 includes a character string 602 for urging the user to input the password, a password input area 603, a SUBMIT button 604, and a CANCEL button 606. The user can operate the operating unit 12 and input the password in the password input area 603. Note that the user needs to input the same password as the password which has been registered in the authentication server 62. When the SUBMIT button 604 is operated by the user, the controlling unit 22 determines that the result is YES at S68, and stores the various types of setting information sequentially designated by the user via the screens 100 to 600 in the setting information storing area 20 (refer to FIG. 1). The enterprise type wireless setting by the user is thereby complete.

Subsequently, the connecting unit 32 attempts wireless connection based on the various types of setting information (various types of information designated via the screens 100 to 600) stored in the setting information storing area 20 (S70). Specifically, the connecting unit 32 wirelessly sends the various types of setting information (EAP authentication method, encryption method, internal authentication method, user ID, password, client certificate) stored in the setting information storing area 20 to the source AP (enterprise AP 60 in this embodiment) of the foregoing particular SSID (SSID selected at S32 of FIG. 3). The enterprise AP 60 sends various types of setting information received from the multi-function device 10 to the authentication server 62 via the wired LAN 64. The authentication server 62 uses the various types of setting information received from the enterprise AP 60 to perform the authentication. This authentication includes, e.g., the authentication on whether the EAP authentication method received from the enterprise AP 60 is supported by the authentication server 62, and the authentication on whether the user ID and password (or user ID and client certificate) received from the enterprise AP 60 are registered in the authentication server 62. The authentication server 62 sends the authentication result to the enterprise AP 60. If the authentication result is successful, the multi-function device 10 is wirelessly connected to the enterprise AP 60.

(Personal Process Performed by Multi-Function Device)

The personal process (process of S36 of FIG. 3) performed by the multi-function device 10 is now explained with reference to FIG. 5. Foremost, the controlling unit 22 determines whether the authentication protocol (that is, the authentication protocol which is currently operating the personal AP 70) which is currently set in the source AP (the personal AP 70 in this embodiment) of the foregoing particular SSID selected at S30 of FIG. 3 uses the encryption method (S82). Specifically, the controlling unit 22 foremost acquires the information 86 included in the Probe Response 80 received at S16 of FIG. 3 from the source personal AP 70 of the foregoing particular SSID. As described above, if the information 86 is information indicating the personal type authentication protocol, the information 86 includes encryption information on whether the encryption method is used. The controlling unit 22 determines that the result is YES at S82 and proceeds to S84 if the encryption information included in the information 86 indicates that an encryption is used, and determines that the result is NO at S82 and proceeds to S98 if the encryption information included in the information 86 indicates that the encryption is not used.

At S84, the display controlling unit 30 causes the displaying unit 14 to display a screen 700 including a character string 702 for urging the user to designate (input) the password, a password input area 703, a SUBMIT button 704, and a CANCEL button 706. The user can operate the operating unit 12 and input the password in the password input area 703. Note that the user needs to input the same password as the password which has been registered in the personal AP 70. The user can operating unit 12 to operate one button of either the SUBMIT button 704 or the CANCEL button 706. The controlling unit 22 monitors the designation complete operation (that is, operation of the SUBMIT button 704) by the user (S86). Note that, when the CANCEL button 706 is operated by the user, the controlling unit 22 ends the personal process.

When the SUBMIT button 704 is operated by the user (YES at S86), the connecting unit 32 selects one combination among a plurality of combinations (refer to FIG. 2) of the personal type authentication method and the encryption method (S88). In the example of FIG. 2, there are six combinations of the authentication method and the encryption method; namely, "WPA-PSK/TKIP," "WPA-PSK/AES," "WPA2-PSK/TKIP," "WPA2-PSK/AES," "Open/WEP," and "Shared Key/WEP." The connecting unit 32 selects one combination among the foregoing six combinations. The order that the connecting unit 32 is to select the combination is decided in advance. The connecting unit 32 selects the combinations in order from the highest security of the wireless communication. Specifically, the connecting unit 32 selects the combinations in the order of "WPA2-PSK/AES," "WPA2-PSK/TKIP," "WPA-PSK/AES," "WPA-PSK/TKIP," "Shared Key/WEP," and "Open/WEP."

Subsequently, the connecting unit 32 uses the one combination selected at S88 and attempts to achieve a wireless connection with the personal AP 70 (S90). The personal AP 70 achieves the wireless connection with the multi-function device 10 if the authentication result is successful. That is, the personal AP 70 performs the authentication in accordance with the authentication method and the encryption method and the authentication result is successful, the personal AP 70 sends information indicating that the authentication result was successful to the multi-function device 10. The controlling unit 22 determines whether the wireless connection was successful (S92). If the controlling unit 22 receives information indicating that the authentication result was successful from the personal AP 70, the controlling unit 22 determines that the connection was successful (YES at S92), and if the controlling unit 22 does not receive the information indicating that the authentication result was successful, the controlling unit 22 determines that the connection was unsuccessful (NO at S92). If the result is YES at S92, the controlling unit 22 stores, in the setting information storing area 20 (refer to FIG. 1), the various types of setting information including the combination of the authentication method and the encryption method, and the password which succeeded in the wireless connection. The personal type wireless setting by the user is thereby complete. The multi-function device 10 can use the various types of setting information stored in the setting information storing area 20 to achieve a wireless connection with the personal AP 70. If the result is YES at S92, the personal process is ended.

Meanwhile, if the result is NO at S92, the controlling unit 22 determines whether all of the foregoing six combinations were selected at S88 (S94). If the result is YES in the foregoing case, the routine proceeds to S96, and the display controlling unit 30 causes to display a screen indicating that the wireless connection was unsuccessful, and ends the personal process. Meanwhile, if the result is NO at S94, the connecting unit 32 selects one combination which has not yet been selected among the foregoing six combinations (S88), and uses that combination and attempts to achieve a wireless connection with the personal AP 70 (S90). Specifically, the connecting unit 32 sequentially selects one combination among a plurality of (six in this embodiment) combinations of the authentication method and the encryption method, and uses the sequentially selected combinations and sequentially attempts to achieve a wireless connection with the personal AP 70.

At S98 which is performed when the result is NO at S82, the authentication method "Open" is used to attempt a wireless connection with the personal AP 70. Specifically, the connecting unit 32 wirelessly sends information showing the authentication method "Open" to the personal AP 70. Here, a password is not sent. The personal AP 70 performs the authentication on whether the authentication method "Open" received from the multi-function device 10 is supported. If the authentication result is successful, the personal AP 70 achieves a wireless connection with the multi-function device 10. Moreover, if the authentication result is successful, the personal AP 70 sends information indicating that the authentication result was successful to the multi-function device 10. The controlling unit 22 determines whether the wireless connection was successful (S100). If the result is YES at S100, the controlling unit 22 stores the setting information including the authentication method "Open" which succeeded in the wireless connection in the setting information storing area 20. The personal type wireless setting by the user is thereby complete. The multi-function device 10 can use the authentication method "Open" included in the setting information stored in the setting information storing area 20 and achieve a wireless connection with the personal AP 70. If the result is YES at S100, the personal process is ended. Meanwhile, if the result is NO at S100, the display controlling unit 30 causes the displaying unit 14 to display a screen indicating that the wireless connection was unsuccessful (S102), and ends the personal process.

An embodiment was explained in detail. The multi-function device 10 displays the screens 100 to 600 (refer to FIG. 4) if the AP (hereinafter referred to as the "particular AP") corresponding to the foregoing particular SSID selected by the user operates in accordance with the enterprise type authentication protocol, and displays the screen 700 (refer to FIG. 5) if it operates in accordance with the personal type authentication protocol. Specifically, the multi-function device 10 displays either the screens 100 to 600 or the screen 700 accordance with the authentication protocol which is currently set in the foregoing particular AP.

There may be a configuration where the screens 100 to 600 for performing the enterprise type wireless setting and the screen 700 for performing the personal type wireless setting are prepared, but the user needs to select which wireless setting is to be performed (hereinafter referred to as the "configuration of Comparative Example 1"). When the configuration of Comparative Example 1 is adopted, the user needs to comprehend in advance whether the foregoing particular AP currently operates in accordance with the authentication protocol of the enterprise type or the personal type, and select whether to perform the wireless setting of the enterprise type or the personal type. It is difficult for a user who is not familiar with wireless settings to comprehend the authentication protocol which is set in the AP. Accordingly, e.g., even though the enterprise type authentication protocol is set in the foregoing particular AP, there may be cases where the user selects the screen 700 for performing the personal type wireless setting. In the foregoing case, even if the user performs the personal type wireless setting, the multi-function device 10 is unable to achieve a wireless connection with the foregoing particular AP to which the enterprise type authentication protocol is set. Specifically, according to the configuration of Comparative Example 1, if the user makes an erroneous selection, it is not possible to achieve a wireless connection with the foregoing particular AP. Meanwhile, according to this embodiment, the multi-function device 10 is able to display the screens 100 to 600 or the screen 700 according to the authentication protocol which is current set in the foregoing particular AP. Thus, the user is not required to select whether to perform the wireless setting of the enterprise type or the personal type, and, consequently, the multi-function device 10 is able to reliably achieve a wireless connection with the foregoing particular AP in comparison to the configuration of Comparative Example 1.

Moreover, there may be a configuration where a common screen for performing the wireless setting is displayed regardless of whether the foregoing particular AP operates in accordance with the authentication protocol of the enterprise type or the personal type (hereinafter referred to as the "configuration of Comparative Example 2"). If the configuration of Comparative Example 2 is adopted, the user needs to comprehend in advance regarding whether the foregoing particular AP currently operates in accordance with the authentication protocol of the enterprise type or the personal type. In addition, the user also needs to comprehend the type of information (information to be designated by the user) that is required when the authentication protocol operating the foregoing particular AP is used. Accordingly, if the user has no comprehension of the above, it is highly likely that appropriate wireless setting will not be performed, and, in the foregoing case, the multi-function device 10 is unable to achieve a wireless connection with the foregoing particular AP. Meanwhile, according to this embodiment, the user is not required to comprehend the authentication protocol operating the foregoing particular AP, or comprehend the type of information to be designated. Consequently, the multi-function device 10 is able to reliably achieve a wireless connection with the foregoing particular AP in comparison to the configuration of Comparative Example 2.

The multi-function device 10 determines whether the type of authentication protocol in accordance with which the foregoing particular access point operates is the enterprise type or the personal type of authentication protocol, and causes to display a different type of setting screen on the displaying unit 14 according to the determination result. Accordingly, the multi-function device 10 may cause to display a setting screen (i.e. the screens 100 to 600 or the screen 700) where the user may designate appropriate information in accordance with the type of authentication protocol in accordance with which the foregoing particular AP operates. The multi-function device 10 may support the user to designate the wireless setting.

Figure 4:
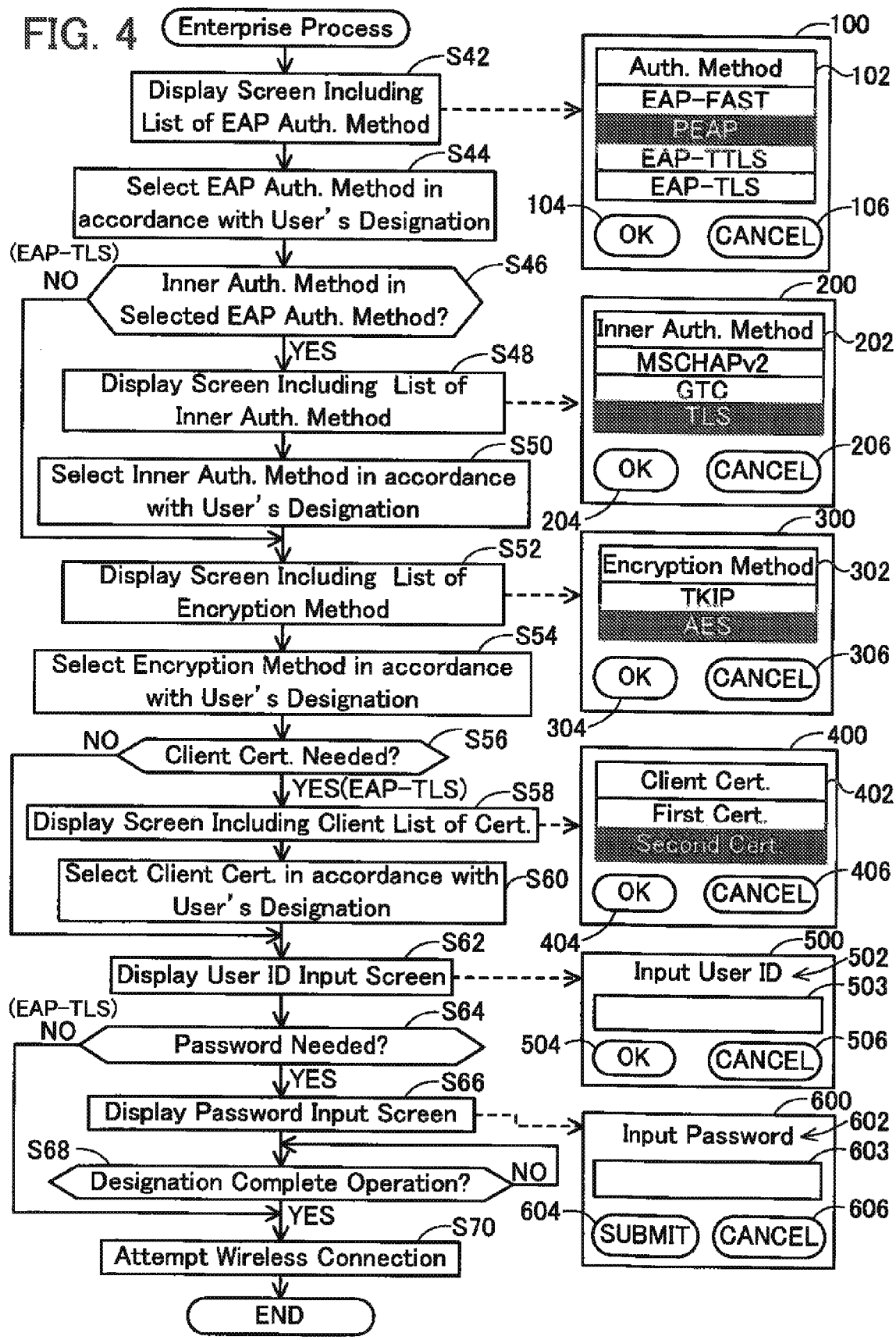
FIG. 4 shows a flowchart of an enterprise process performed by the multi-function device.

The multi-function device 10 sequentially displays on the displaying unit 14 the plurality of screens 100 to 600 to be used for the user to designate the plurality of information required for the enterprise type wireless setting in the enterprise process (refer to FIG. 4). The user can sequentially designate the plurality of information according to the plurality of screens displayed on the displaying unit 14. For example, there may be a configuration where only one screen is displayed for designating the plurality of information required for the enterprise type wireless setting (hereinafter referred to as the "configuration of Comparative Example 3"). With the configuration of Comparative Example 3, the user needs to designate the plurality of information on one screen. It is difficult for a user who is not familiar with wireless settings to designate the plurality of necessary information without omission. Meanwhile, since this embodiment adopts a configuration where the respective screens 100 to 600 are sequentially displayed (so-called wizard format (interactive format)), the user can easily designate the plurality of necessary information in comparison to the configuration of Comparative Example 3. In particular, since this embodiment adopts a configuration of proceeding to the subsequent screen when information is input to the respective screens 100 to 600, it is possible to inhibit the user from forgetting to designate necessary information.

Moreover, in the enterprise process (refer to FIG. 4), the multi-function device 10 changes the screen which is displayed on the displaying unit 14 in accordance with the EAP authentication method designated by the user. Specifically, the multi-function device 10 causes the displaying unit 14 to display a screen for allowing the user to designate the contents of the wireless setting which are required for the wireless connection using the EAP authentication method designated by the user. The multi-function device 10 causes the displaying unit 14 not to display a screen for allowing the user to designate the contents of the wireless setting which are not required for the wireless connection using the EAP authentication method designated by the user. For example, if the EAP authentication method is EAP-TLS, the multi-function device 10 causes the displaying unit 14 to display sequentially the screens 300, 400, 500 for allowing the user to designate the encryption method, the client certificate, and the user ID, and causes the displaying unit 14 not to display the screens 200, 600 for allowing the user to designate the internal authentication method and the password. Meanwhile, e.g., if the EAP authentication method is PEAP, the multi-function device 10 causes the displaying unit 14 to display sequentially the screens 200, 300, 500, 600 for allowing the user to designate the internal authentication method, the encryption method, the user ID, and the password, and causes the displaying unit 14 not to display the screen 400 for allowing the user to designate the client certificate. The user can perform the wireless setting according to the screens displayed on the displaying unit 14, and is not required to comprehend, in advance, which type of information needs to be designated.

In the personal process (refer to FIG. 5), the multi-function device 10 sequentially selects the combinations of the authentication method and the encryption method of the personal type authentication method, and sequentially attempts the wireless connection with the AP. The multi-function device 10 uses the setting information including the combination of the authentication method and the encryption method that succeeded in the wireless connection to achieve the wireless connection with the personal AP 70. Thus, the user is not required to designate the combination of the authentication method and the encryption method.

As evident from the foregoing explanation, the multi-function device 10 is an example of the "wireless communication system". The Information Element 82 is an example of the "specific information", and the SSID 84 is an example of the "identification information". The enterprise type authentication protocol; i.e., the authentication protocol (WPA-Enterprise, WPA2-Enterprise) for the wireless communication using IEEE802.1x of the wireless LAN standard is an example of the "first type of authentication protocol", and the EAP authentication method is an example of the "first type of authentication method". The personal type authentication protocol; that is, the authentication protocol for the wireless communication that does not use IEEE802.1x of the wireless LAN standard is an example of the "second type of authentication protocol", and WPA-PSK, WPA2-PSK, Open, Shared key and the like are examples of the "second type of authentication method". Screens 100 to 600 are examples of the "first type of setting screen", and the screen 700 is an example of the "second type of setting screen".

Modified Examples (1) In the foregoing embodiments, although the screens 100 to 700 are displayed on the displaying unit 14 of the multi-function device 10, alternatively, the screens may also be displayed on the displaying unit of the external device (example e.g., the PC) connected to the multi-function device 10. In the foregoing case, the multi-function device 10 may comprise a partial configuration among the acquiring unit 24, the selecting unit 26, the determining unit 28 and the display controlling unit 30, and the foregoing external device may comprise the remaining configuration. In the foregoing case, the multi-function device 10 and the external device are examples of the "wireless communication system".

Figure 3:
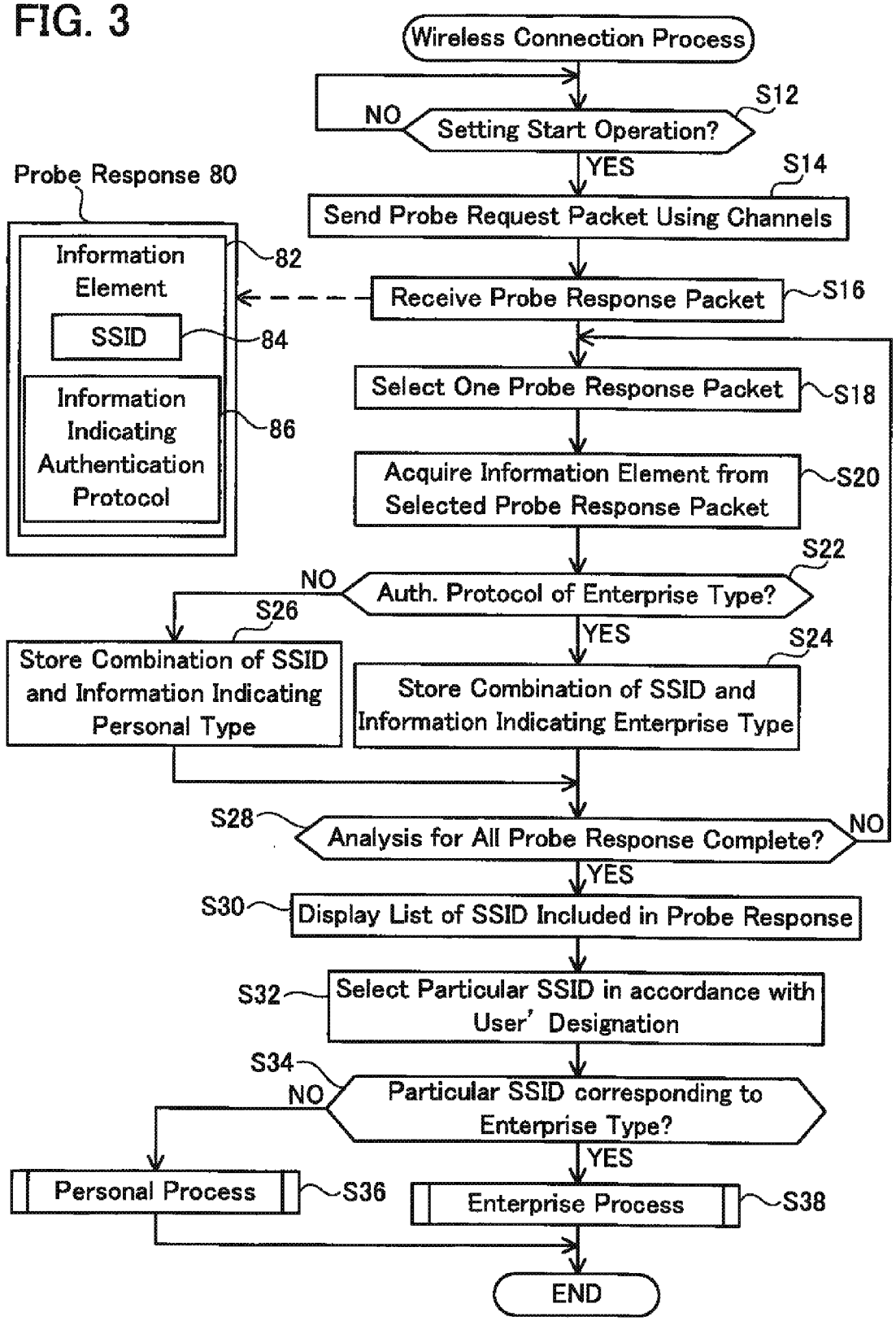
FIG. 3 shows a flowchart of a wireless connection process performed by a multi-function device.

(2) At S30 of FIG. 3, the display controlling unit 30 displays the SSID list on the displaying unit 14. However, alternatively, the display controlling unit 30 may generate a list indicating the combination of the SSID and information indicating whether the AP corresponding to such SSID operates according to the enterprise type authentication protocol or operates according to the personal type authentication protocol, and display such list on the displaying unit 14.

Figure 5:
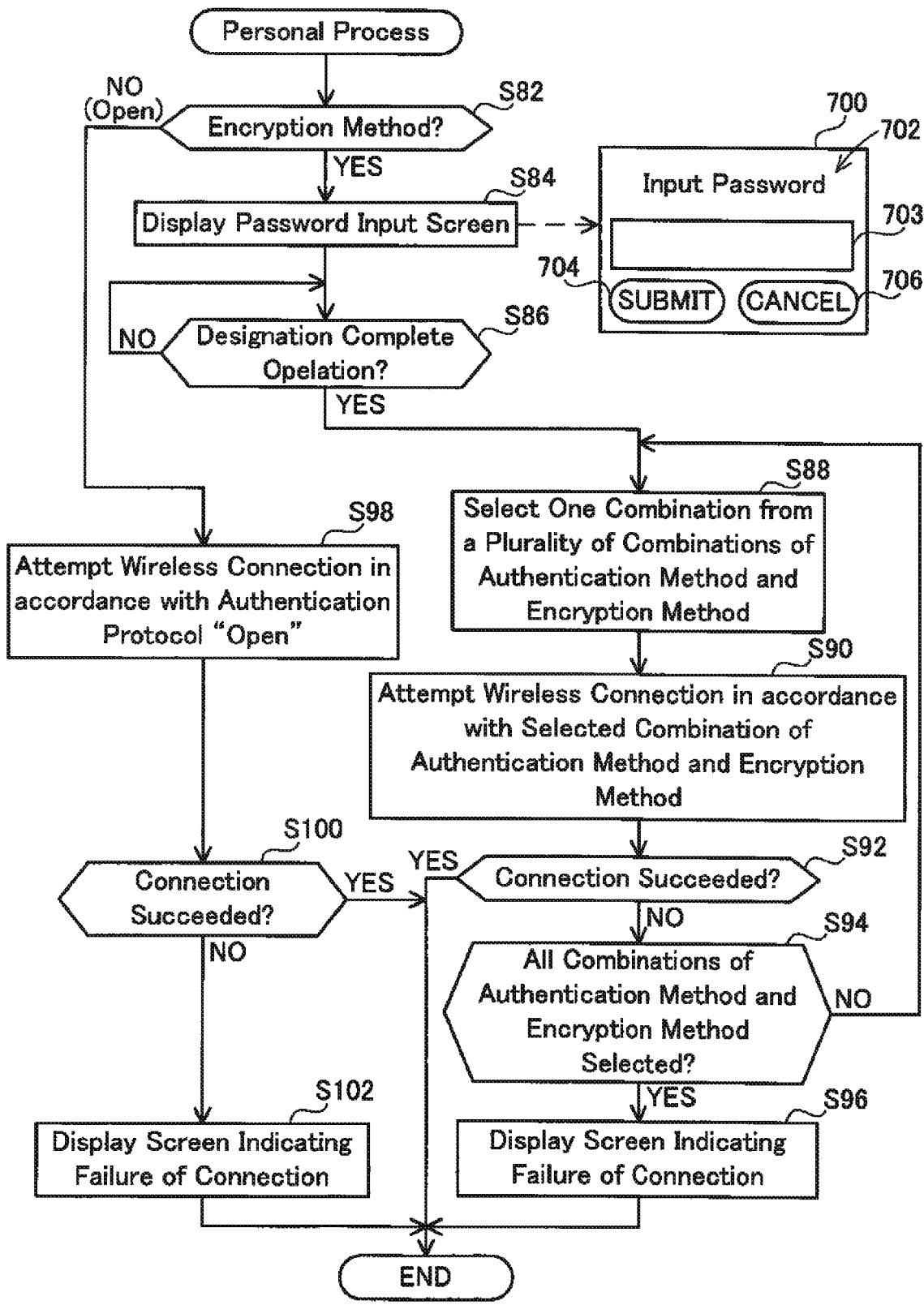
FIG. 5 shows a flowchart of a personal process performed by the multi-function device.

(3) In the foregoing embodiments, at S88 of FIG. 5, the multi-function device 10 sequentially selects one combination among the six combinations of the authentication protocol and the encryption method. Alternatively, the multi-function device 10 may change the combination to be selected in accordance with the number of characters of the password (refer to S84 of FIG. 5) which was input by the user. For example, if the number of characters of the password is five characters, "Shared key/WEP" and "Open/WEP" may be the target of selection among the six combinations, and the remaining combinations do not need to be the targets of selection.

(4) In the foregoing embodiments, in the personal process (refer to FIG. 5), the multi-function device 10 sequentially selects one combination among the plurality of combinations of the authentication protocol and the encryption method, and uses the one combination which was sequentially selected to sequentially attempt the wireless connection. Nevertheless, in the personal process, the multi-function device 10 may, as with the enterprise process (refer to FIG. 4), cause the displaying unit 14 to display sequentially the plurality of screens to be used by the user for sequentially designating information concerning the setting items required for the wireless setting. In the foregoing case, the plurality of screens is an example of the "second type of setting screen".

(5) In the foregoing embodiments, the authentication method and the encryption method are sequentially selected in the order of "WPA2-PSK/AES," "WPA2-PSK/TKIP," "WPA-PSK/AES," "WPA-PSK/TKIP" . . . ; that is, based on the authentication method. Specifically, of the two combinations (e.g., "WPA2-PSK/AES" and "WPA2-PSK/TKIP") with the same authentication method, the combination (e.g., "WPA2-PSK/AES") including an encryption method with relatively high security is selected prior to the combination (e.g., "WPA2/TKIP") including an encryption method with relatively low security. Nevertheless, alternatively, the authentication method and the encryption method may be sequentially selected based on the encryption method. Specifically, the authentication method and the encryption method may be sequentially selected in the order of "WPA2-PSK/AES," "WPA-PSK/AES," "WPA2-PSK/TKIP," and "WPA-PSK/TKIP." In the foregoing case, of the two combinations (e.g., "WPA2-PSK/AES" and "WPA-PSK/AES") with the same encryption method, the combination (e.g., "WPA2-PSK/AES") including an authentication method with relatively high security is selected prior to the combination (e.g., "WPA-PSK/AES") including the authentication method with relatively low security.

Whether the selection is to be based on the authentication method or the encryption method may be decided based on a priority that is given either the authentication or the encryption. However, if the access point supports the plurality of combinations of the authentication method and the encryption method, the access point is normally set to perform communication with a combination of high security. Thus, if connection to the access point is attempted in order from the highest security of the authentication method or in order from the highest security of the encryption method, in comparison to the opposite case, the possibility of succeeding in connecting to the access point quickly will increase.

(6) The technique of the foregoing embodiment may be applied to the controlling device of other wireless communication devices such as a PC, mobile communication terminal, server, printer, scanner, telephone, or facsimile in addition to the multi-function device 10.

(7) In the foregoing embodiments, respective units 24 to 32 are realized as a result of the controlling unit 22 performing the processes according to the program 18. Nevertheless, at least one unit of respective units 24 to 32 may alternately be realized by a hardware resource such as a logic circuit.

The invention claimed is:

1. A wireless communication system comprising:
a processor configured to execute:
acquiring, from each of one or more access points, an information element including identification information corresponding to the access point;
selecting, from one or more of the acquired identification information, particular identification information corresponding to a particular access point among the one or more access points;
determining, in a case where the particular identification information is selected, and based on the information element acquired from the particular access point, whether the particular access point operates in accordance with a first type of authentication protocol in which an authentication is performed by an authentication server or in accordance with a second type of authentication protocol in which an authentication is performed by the particular access point, wherein, in a case where the information element includes information indicating WiFi Protected Access (WPA)-Enterprise or WPA2-Enterprise, the processor determines that the particular access point operates in accordance with the first type of authentication protocol, and wherein, in a case where the information element does not include any of the information indicating WPA-Enterprise and the information indicating WPA2-Enterprise, the processor determines that the particular access point operates in accordance with the second type of authentication protocol;
causing a displaying unit to display a first type of setting screen in a first case where a determination is made that the particular access point operates in accordance with the first type of authentication protocol, the first type of setting screen permitting a user to give a setting for a wireless communication with the particular access point that operates in accordance with the first type of authentication protocol;
causing the displaying unit to display a second type of setting screen which is different from the first type of setting screen in a second case where a determination is made that the particular access point operates in accordance with the second type of authentication protocol, the second type of setting screen permitting the user to give a setting for a wireless communication with the particular access point that operates in accordance with the second type of authentication protocol; and
attempting a wireless connection with the particular access point based on the setting given by the user using the first type of setting screen or the second type of setting screen.

2. The wireless communication system as in claim 1, wherein
acquiring the information element includes sending a probe request signal to each of the one or more access points and receiving one or more probe response signals from the one or more access points, so as to acquire one or more information elements included in the one or more probe response signals.

3. The wireless communication system as in claim 1, wherein
- the first type of setting screen includes a screen for permitting the user to designate an authentication method and an encryption method,
- the second type of setting screen does not include the screen for permitting the user to designate an authentication method and an encryption method,
- in a case where the first type of setting screen is displayed on the displaying unit, attempting the wireless connection includes attempting, after one combination of an authentication method and an encryption method is designated by the user, the wireless connection with the particular access point using the one combination designated by the user, and
- in a case where the second type of setting screen is displayed on the displaying unit, the processor is configured to further execute sequentially selecting one combination from a plurality of combinations of an authentication method and an encryption method and attempting the wireless connection includes attempting the wireless connection with the particular access point using the sequentially selected one combination.

4. The wireless communication system as in claim 1, wherein
- the first type of setting screen includes a plurality of screens for permitting the user to sequentially designate a plurality of information related with a plurality of setting items, and
- the plurality of screens is sequentially displayed on the displaying unit.

5. The wireless communication system as in claim 1, wherein
- in the first case, causing the displaying unit to display the first type of setting screen includes causing the displaying unit to display the first type of setting screen including information indicating a plurality of first types of authentication methods corresponding to the first type of authentication protocol and not including information indicating a second type of authentication method corresponding to the second type of authentication protocol, and
- the first type of setting screen is a screen for permitting the user to designate one of the plurality of the first type of authentication method.

* * * * *